(12) United States Patent
Mazzotti et al.

(10) Patent No.: US 12,330,995 B2
(45) Date of Patent: Jun. 17, 2025

(54) METHOD FOR OBTAINING PORCELAIN STONEWARE TILES WITH ANTI-SLIP SURFACE

(71) Applicant: GRUPPO CONCORDE S.P.A., Fiorano Modenese (IT)

(72) Inventors: Maurizio Mazzotti, Imola (IT); Yuri Beghi, Formigine (IT); Alan Bazzani, Marano sul Panaro (IT)

(73) Assignee: GRUPPO CONCORDE S.P.A., Fiorano Modenese (IT)

( * ) Notice: Subject to any disclaimer, the term of this patent is extended or adjusted under 35 U.S.C. 154(b) by 49 days.

(21) Appl. No.: 18/143,639

(22) Filed: May 5, 2023

(65) Prior Publication Data

US 2024/0368044 A1    Nov. 7, 2024

(51) Int. Cl.
*C04B 41/50* (2006.01)
*C03C 8/16* (2006.01)
*C04B 33/24* (2006.01)
*C04B 41/00* (2006.01)
*C04B 41/45* (2006.01)
*C04B 41/86* (2006.01)
*C09K 3/14* (2006.01)

(52) U.S. Cl.
CPC ............ *C04B 41/5022* (2013.01); *C03C 8/16* (2013.01); *C04B 33/24* (2013.01); *C04B 41/0072* (2013.01); *C04B 41/4547* (2013.01); *C04B 41/86* (2013.01); *C09K 3/1418* (2013.01); *C03C 2209/00* (2013.01)

(58) Field of Classification Search
CPC . C04B 41/5022; C04B 33/24; C04B 41/0072; C04B 41/4547; C03C 8/16; C03C 2209/00; C09K 3/1418
See application file for complete search history.

(56) References Cited

FOREIGN PATENT DOCUMENTS

| CN | 108911697 | * | 11/2018 |
| CN | 108911697 A | | 11/2018 |
| EP | 3613721 A1 | | 2/2020 |
| EP | 22202511.6 | | 10/2022 |
| IT | 102021000028466 | | 11/2021 |

* cited by examiner

*Primary Examiner* — Nathan T Leong
(74) *Attorney, Agent, or Firm* — Dickinson Wright PLLC; Andrew D. Dorisio

(57) ABSTRACT

A method for obtaining a porcelain stoneware tile with anti-slip surface includes an enameling step, said step comprising the deposition—on the walkable surface of the tile—of a mixture of micro-grits added to a usual enamel, most of said micro-grits having dimensions smaller than 60 μm and being in a percentage smaller than 25% and preferably smaller than 20% by dry weight of the mixture, the remainder consisting of enamel. Furthermore, a tile with walkable surface layer may be obtained according to the aforementioned method.

7 Claims, No Drawings

METHOD FOR OBTAINING PORCELAIN STONEWARE TILES WITH ANTI-SLIP SURFACE

The disclosures of Italian patent application NO. 102021000028466 filed on Nov. 9, 2021, and a corresponding European patent application No. EP22202511.6 filed on Oct. 19, 2022, are incorporated herein by reference.

TECHNICAL FIELD

Forming an object of the present invention is a method for obtaining a porcelain stoneware tile with anti-slip walkable surface, and a tile thus obtained.

BACKGROUND

As known, an important aspect for a porcelain stoneware tile lies in the fact that it has a specific technical requirement relating to the "anti-slip" function, that is resistance to slipping as a function of the inclination angle according to which an individual walking on the inclined plane is no longer capable of keeping balance.

Such requirement is regulated by specific regulations such as DIN51130 (R) and DIN51097 (A+B+C).

At the same time, it is equally important for the tile to have a surface (still and always intended as the "walkable surface") that is easily cleanable and difficult to dirty.

A tile of the type indicated above is obtained through an industrial or production process which envisages various steps. It is used to obtain a porcelain stoneware tile or a tile, that is a tile of a type of ceramic which—as defined by specific regulations—has a water absorption coefficient smaller than 0.5%. Such tile also has a high degree of resistance to bending and a high resistance to abrasion.

Such tile is obtained starting from clays, feldspars, kaolins and sand. After appropriately preparing the raw materials useful for producing (grinding and atomisation), they are pressed so as to form the unprocessed tile. Therefore, it is usually dried using hot air so as to remove moisture from the compacted body and confer tensile strength thereto. Such drying step is crucial to making the future tile, not yet subjected to firing, resistant to the subsequent process mechanical stresses.

At the same time an enamel, that is a product adapted to protect the aforementioned surface from abrasion, is prepared. The enamel has specifications and known vitrifying and hardening characteristics (for example, there is used the enamel known under the trade name KR62), and it is deposited on the surface of the dried tile after a graphic and material decoration has been deposited on said surface for example by means of digital printers, using ceramic dyes and desired superficial effects. However, before the step of decorating using digital printing, there is added a first layer of enamel referred to as slipware which has the function of preparing the support to the subsequent decoration step, and it also has the purpose of adjusting the colour tone of the support and make it more reproducible in the subsequent productions.

Therefore, in a step for producing the tile subsequent to drying, it is enameled (using the aforementioned enamel). The "unprocessed" tile thus prepared passes to the step for firing in appropriate roller furnaces which causes the vitrification and firing of the tile (which is carried out at a maximum temperature of about 1230° C. and dwell time in the furnace which varies depending on the format and thickness).

Upon exiting from the furnace, the tile is subjected to the grinding step in which it is squared and then it is packaged.

CN108911697 describes a manufacturing method of an anti-skid floor tile and belongs to the field of ceramic tile manufacturing. The method comprises the above cited steps, in particular a glazing is carried out using a mixed glaze of wear-resistant anti-skid particles and engobe. The mixed glaze is prepared from mixed glaze slurry composed of engobe glaze slurry and the wear-resistant anti-skid particles, wherein the weight content of the engobe glaze slurry in the mixed glaze slurry is 60-70%, and the weight content of the wear-resistant anti-skid particles is 30-40%. The wear-resistant anti-skid particles are made of one or more wear-resistant anti-skid particles selected from corundum, emery, diamond and quartzsand; the particle size of the wear-resistant anti-skid particles is 40-150 meshes.

SUMMARY

An object of the present invention is to provide a method for manufacturing a porcelain stoneware tile which can confer to the tile a surface finish with high anti-slip value, as well as the ability to be subjected to cleaning in a deep and simple manner.

In particular, an object of the invention is to provide a method that allows to obtain a tile which meets the technical anti-slip requirement which falls within the recommendation laid down by the DIN51130 and 51097 standards that is with an R10 A+B index.

Another object is to provide a tile of the type mentioned above which has at least one of a surface that is particularly pleasant to touch, nd which is ultra-easy to clean with respect to tiles of the prior art.

Another object of the invention is to provide a tile whose (walkable) surface has an optimal opacity, a lower susceptibility to getting dirty, a optimal anti-slip characteristics.

Another object is to provide a tile with a surface that is soft to touch, less susceptible to getting dirty with respect to known tiles and which allows a high ease of cleaning.

These and other objects which shall be more apparent to the person skilled in the art are attained by a method and by a porcelain stoneware tile according to the attached claims.

DETAILED DESCRIPTION

A method for obtaining a porcelain stoneware tile having an anti-slip surface according to the invention comprises the usual production steps used to obtain a usual porcelain stoneware tile, but with the substantial change lying in the fact that the enameling step is carried out using a product obtained in a particular manner so as to confer a high anti-slip ability to the (walkable) surface of the tile.

Therefore, the method comprises preparing the raw materials for the mixture suitable to define "the body" of the tile; such step is followed by pressing such mixture with the resulting forming and compaction thereof.

The tile (or "tile precursor") thus obtained is introduced into a dryer, usually vertical, into which there is blown hot air (with temperatures of about) 200° so as to remove moisture from such tile and confer an appropriate tensile strength thereto. Such drying step is crucial to making the tile, not yet fired, resistant to the subsequent process mechanical stresses.

At this point, the production method envisages that the tile be subjected to enameling. Such operation is carried out using an enameling product (not to be confused with the actual "enamel") obtained according to novel methods and which confers—to the enameled surface of the final tile for indoor use-optimal anti-slip characteristics (relating to tiles for outdoor and indoor use); in other words, the enameling product used allows to obtain a tile with surface finish with an anti-skid or anti-slip index equal to 10 according to the DIN 51130 (R) standard and A+B according to the DIN 51097 (A+B+C) standard (that is an R10 A+B index). At the same time, the surface of the tile remains particularly pleasant to touch, it has an optimal opacity and it is less susceptible to getting dirty with respect to similar tiles of the prior art where a high anti-slip characteristic is obtained by mechanically abrasing the surface of the tile using circular pressure brushes therefore partly corroding the surface of the enamel. The tile according to the invention obtained using the aforementioned enameling product also offers the possibility of improved cleaning with respect to known tiles.

More particularly, the enameling product used is obtained by adding—to a conventional enamel (for example the one known under the trade name KR 62)—two particular grits with particle size smaller than that of the conventional technical grits (usually equal to 0.12-0.15 mm): each grit (or "micro-grit") has a particle size smaller than 100 µm.

The mixture of micro-grits is present in a percentage smaller than 25% by weight in the enameling product: a preferred example of the latter comprises, dry, 20% of the mixture of micro-grits and 80% of enamel. However, there can be generally used a percentage comprised between 25% and 15% advantageously between 23% and 17%, preferably between 21% and 19% by weight of the total dry weight of the enameling 30 product.

A first micro-grit has the following components: Al2O3, CaO; K2O, MgO, Na2O, SiO2, SrO and ZnO with a particle size 100% smaller than 100 µm and in particular, in a percentage comprised between 40% and 50%, smaller than 60 µm.

An example of composition of the first micro-grit is as follows:
Al2O3 between 10% and 20% by weight on the total;
Cao between 10% and 20% by weight;
K2O between 1% and 5% by weight;
MgO between 1% and 5% by weight;
Na2O between 1% and 5% by weight;
SiO2 between 50% and 60% by weight;
SrO between 1% and 5% by weight;
ZnO between 1% and 5% by weight.

The second micro-grit has the same components as the first micro-grit, but present with the following percentages:
Al2O3 between 20% and 30% by weight on the total;
Cao between 5% and 10% by weight on the total;
K2O between 1% and 5% by weight on the total;
MgO between 1% and 5% by weight on the total;
Na2O between 1% and 5% by weight on the total;
SiO2 between 50% and 60% by weight on the total;
ZnO between 1% and 5% by weight on the total.

This second micro-grit has a particle size 100% smaller than 100 µm and in a percentage between 50-70%, has a particle size smaller than 60 µm.

The aforementioned micro-grits are mixed physically that is mechanically to each other in percentages comprised between 30% and 70% of the first grit with a percentage comprised between 70% and 30% of the second grit. A possible percentage is the one which envisages the mixture of grits containing said first and second grit in equal parts (50% each).

Following such operation, there is defined a mixture of micro-grit which is added to the enamel without using a further application in aqueous suspension. With such operation, in the suspension thus obtained, the micro-grit mixture is "embedded" in the enamel and it does not remain free on the surface thereof after applying the enameling product on the tile; the micro-grit mixture, even though present on the surface of the tile, is surrounded by a layer of enamel which has its own vitrifying and hardening characteristics, which confers anti-slip characteristics to the surface, while at the same time less susceptible to getting dirty or easier to clean.

Mixing—as described above—the two initial micro-grits allows to obtain a micro-grit mixture having the following composition characteristics:
Al2O3 between 15% and 30% by weight on the total;
Cao between 5% and 15% by weight on the total;
K2O between 1% and 5% by weight on the total;
MgO between 1% and 5% by weight on the total;
Na2O between 1% and 5% by weight on the total;
SiO2 between 50% and 60% by weight on the total;
SrO between 1% and 5% by weight on the total;
ZnO between 1% and 5% by weight on the total.

This micro-grit mixture has a variable particle size, but always smaller than 100 µm. Particularly, it has: 0%-10% by weight of components with particle size comprised between 75 µm and 100 µm (none with particle size larger than 100 µm); between 50% and 70% by weight of components with particle size comprised between 60 µm and 75 µm; between 15% and 30% by weight of components with particle size comprised between 45 µm and 60 µm; 5-15% by weight of components with particle size comprised between 38 µm and 45 µm; and between 5% and 15% of component with particle size smaller than 38 µm.

After preparing the enameling product parallel to the production line of the tile, which has reached the enameling step, the tile is firstly brushed using a rotary brush (soft) so as remove superficial residues that do not adhere to the tile and perimeter burrs from the surface; therefore the material removed by brushing is suctioned or blown from the tile.

After such step there follows the enameling process which envisages a (known) slipware deposition procedure (white and coloured) using an airbrush system. After such procedure, tile cooled, the surface thereof is decorated digitally (usually by depositing ceramic dyes using known "printers or digital (or inkjet)) decorating machines in this step there being carried out the graphic and material decoration of the product using ceramic dyes and possible surface effects.

After the decoration, the enameling product (suspension) mentioned above containing micro-grits is applied. A suspending agent (less than 5%, preferably equal to 2.0% by weight in liquid form) is added to such product for a better rheological stabilisation of the suspension.

By way of example, the product known under the trade name CERRAD 600 preferably with a 1 to 5 ratio with respect to the micro-grit (for example, 5 litres of suspension 25 kg of micro-grit) is used as suspending agent.

The suspending agent, the micro-grit and water are therefore introduced into a turbo-dissolver so as to determine a product which is diluted using liquid enamel. The entirety is sent to the enameling line and the suspension thus obtained is applied to the surface of the tile using an airbrush. The mixture has a weight of 15-16 g and density of 1330-1340 g/l something that entails the deposition of an even surface (where, as mentioned, the micro-grit mixture is "coated" by the enamel).

By way of example, about 800 g of enamel KR62 are used for about 230 g of micro-grits per litre of enameling product with density equal to 1690 g/l.

After depositing the enameling product using an airbrush, the tile moves to the firing step in a usual roller furnace and, exiting from the furnace, before a step for grinding and choosing the product, it is brushed on the surface with low pressure (for example, using a brushing device defined by an IRI black abrasive ring, with intermediate ring hardness and rotation speed equal to 70 revolutions/minute, with exerted pressure identified by the absorption of the motor of the brushing device-expressed in Amperes—of 4.3 Amperes so as remove any firing residues and "clean" and further soften the surface of the tile. The reduced pressure, lower than what occurs in the prior art solutions (where there is instead usually used an IRI red abrasive ring, with high hardness, with rotation speed equal to 70 revolutions/minute, with exerted pressure identified by the absorption of the motor of the brushing device—expressed in Amperes—of 4.8 Amperes) allows to have a greater durability of the brush, lesser abrasion of the enameling product and therefore lesser susceptibility of the surface of the tile to getting dirty.

The invention allows to obtain a tile on whose walkable surface there is present an enamel which comprises micro-grits, which generate an anti-slip effect on the aforementioned surface. Due to the methods through which the enameling product is prepared, the micro-grits are "embedded" in the enamel in the sense that such micro-grits, even at the walkable surface of the tile (therefore even if exposed), are coated-on the surface—by the enamel which creates protective layer, which is vitrified and easier to clean, while simultaneously allowing said micro-grits to carry out an anti-slip action.

Various tests were conducted to measure the dynamic coefficient of friction between a slipping element and a test surface of a tile obtained according to the invention.

Test N° 1

There was prepared a tile measuring 60 cm×60 cm, whose (walkable) surface was enameled using an enameling product obtained by suspending a KR62 enamel into which there was introduced a micro-grit obtained from combining micro-grits with the characteristics indicated above.

The tile was tested using an instrument for measuring the dynamic coefficient of friction or slipperiness meter operating according to the method known as TORTUS developed by the British Ceramic Research Association Ltd.

The test was conducted as follows: on the surface of the tile there is moved slider with a diameter measuring 9 mm and with an applied load of 200 g at a speed of 17 mm/s. The operation is firstly carried out with a dry surface (and with a leather slider) and therefore with wet surface (and a slider made of standard 4S hard rubber).

The data below were obtained:

| Test conditions | Type of path | Coefficient of friction (COFd)μ |
|---|---|---|
| Dry (d) Leather | Straight | 0.62 |
| | Oblique R | 0.62 |
| | Oblique L | 0.63 |
| Average coefficient of friction on dry (μ): 0.62 | | |
| Wet (water + detergent agent) (w) Standard 4S hard rubber | Straight | 0.72 |
| | Oblique R | 0.72 |
| | Oblique L | 0.72 |

| Test conditions | Type of path | Coefficient of friction (COFd)μ |
|---|---|---|
| Average coefficient of friction on dry (μ): 0.72 | | |

REQUIREMENTS
REFERENCE VALUES
(B.C.R. CEC 6/81)

$\mu > 0.19$: Dangerous slipperiness
$\mu 0.20 < \mu < 0.39$: Excessive slipperiness
$\mu 40 < \mu < 0.74$: Satisfactory friction
$\mu > 0.75$: Excellent friction Therefore, the solution has high coefficient of friction both on dry and wet.

Test N° 2

There were taken into account three tiles obtained according to the invention, but with slight differences in the composition of micro-grits. They were subjected to a dynamic coefficient test with a BOT-3000E tribometer. The following measurements were obtained after wetting the surface of the tiles with water containing 0.005% of sodium laurinsulfate. As reference datum on a standard tile there were obtained coefficient of friction values equal to 0.28 and 0.30.

With the test on the tile according to the invention there were obtained a plurality of measurements, whose values are shown in the table below.

| Test condition | Measurement 1 | Measurement 2 | Measurement 3 | Measurement 4 | Average |
|---|---|---|---|---|---|
| Tile 1 wet | 0.83 | 0.83 | 0.84 | 0.83 | 0.83 |
| Tile 2 wet | 0.82 | 0.83 | 0.83 | 0.84 | 0.83 |
| Tile 3 wet | 0.80 | 0.80 | 0.81 | 0.83 | 0.81 |

The traced values were compared with the value of the ANSI A 137.1:2017 standard which measures the dynamic coefficient of friction and which requires a threshold value of 0.42 for floors of indoor spaces suitable to be treaded on when wet. The table shows that the detected coefficient of friction is almost twice the threshold value.

Test N° 3

In this test there was taken into account a tile like the one used in test n° 1. For the test there was used a ramp slipperiness meter cod. MCP150. The test was conducted keeping the tile inclined and according to the DIN 5197: 1992 standard.

From the test there was detected an average slipping angle equal to 22. Given that the standard has the following classification (based on the inclination angles)

| Table of average values | Classification of the group |
|---|---|
| $\geq 12°$ | A |
| $\geq 18°$ | B |
| $\leq 24°$ | C | the tests show that the porcelain stoneware tile, obtained with an enameled surface with mixture or enameling product containing micro-grits as described above, has characteristics according to classification B of the DIN51097 standard.

The analysis of the tests shows that a tile obtained according to the method described above has a high dynamic coefficient of friction.

CONCLUSIONS

It has been demonstrated that a tile obtained according to the invention attains the objects of the invention. Such tile has an enameled walkable surface, where such surface contains a mixture of micro-grits obtained from two micro-grits mixed to each other and added to a vitrifying and hardening enamel; the enamel wraps around the micro-grits, even those found in relief on the surface of the tile. Therefore, this surface has a high dynamic coefficient of friction thanks to the micro-grits, but also a surface that is easy to clean, soft to touch and less susceptible to getting dirty thanks to the enamel which coats the micro-grits on said surface.

There has been described a preferred solution of the invention, whose field is however defined by the scope of protection of the claims that follow.

The invention claimed is:

1. A method for obtaining a porcelain stoneware tile with anti-slip surface, said method comprising the steps of
preparing the raw materials suitable to obtain the tile, and forming a mixture suitable to define the tile,
pressing the mixture,
drying the product obtained by pressing,
enamelling the dried tile with an enamelling product,
firing the enamelled tile,
grinding the enamelled tile,
wherein
the enamelling step is carried out with an enamelling product comprising a mixture of micro-grits having dimensions smaller than 100 μm added to an enamel, the micro-grits being present in the mixture in a percentage smaller than or equal to 25% by dry weight, the remaining percentage mainly being defined by enamel, said mixture of micro-grits comprising two micro-grits, a first micro-grit having the following composition:
$Al_2O_3$ between 10% and 20% by weight on the total;
CaO between 10% and 20% by weight on the total;
$K_2O$ between 1% and 5% by weight on the total;
MgO between 1% and 5% by weight on the total;
$Na_2O$ between 1% and 5% by weight on the total;
$SiO_2$ between 50% and 60% by weight on the total;
SrO between 1% and 5% by weight on the total;
ZnO between 1% and 5% by weight on the total,
the second micro-grit having the following composition:
$Al_2O_3$ between 20% and 30% by weight on the total;
CaO between 5% and 10% by weight on the total;
$K_2O$ between 1% and 5% by weight on the total;
MgO between 1% and 5% by weight on the total;
$Na_2O$ between 1% and 5% by weight on the total;
$SiO_2$ between 50% and 60% by weight on the total;
ZnO between 1% and 5% by weight on the total.

2. The method according to claim 1, wherein the first micro-grit has a particle size 100% smaller than 100 μm, and, in a percentage comprised between 40% and 50%, smaller than 60 μm, the second micro-grit having a particle size 100% smaller than 100 μm and, in a percentage between 50 and 70%, it has a particle size smaller than 60 μm.

3. The method according to claim 2, wherein the mixture of micro-grits is obtained mechanically.

4. The method according to claim 1, wherein the micro-grit mixture has 0%-10% by weight of components with particle size comprised between 75 μm and 100 μm, none with particle size larger than 100 μm; between 50% and 70% by weight of components with particle size comprised between 60 μm and 75 μm; between 15% and 30% by weight of components with particle size comprised between 45 μm and 60 μm; 5-15% by weight of components with particle size comprised between 38 μm and 45 μm; and between 5% and 15% of component with particle size smaller than 38 μm.

5. The method according to claim 1, wherein the enamelling product contains a percentage of suspending agent smaller than 5% by weight of liquid.

6. The method according to claim 5, wherein the percentage of suspending agent is equal to 2% by weight of liquid.

7. The method according to claim 1, wherein the enamelling product is deposited on the surface of the tile using an airbrush.

* * * * *